Figure 1:
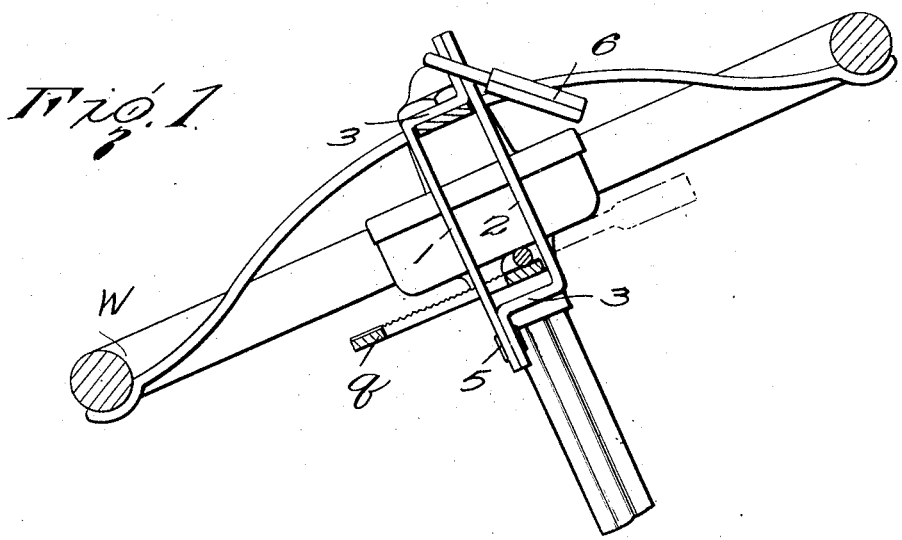

C. BRACKBILL.
STEERING WHEEL LOCK.
APPLICATION FILED OCT. 26, 1917.

1,356,511.  Patented Oct. 26, 1920.

Charles Brackbill
Inventor

By Geo. P. Kimmel
Attorney

UNITED STATES PATENT OFFICE.

CHARLES BRACKBILL, OF PHILADELPHIA, PENNSYLVANIA.

STEERING-WHEEL LOCK.

1,356,511.     Specification of Letters Patent.     Patented Oct. 26, 1920.

Application filed October 26, 1917. Serial No. 198,636.

*To all whom it may concern:*

Be it known that I, CHARLES BRACKBILL, a citizen of the United States, and resident of Philadelphia, in the county of Philadelphia and State of Pennsylvania, have invented certain new and useful Improvements in Steering-Wheel Locks, of which the following is a specification.

This invention relates to locks and it is the dominant object of the invention to provide a novel lock capable of being readily attached to the steering wheels of motor driven vehicles whereby theft of the same will be prevented.

Among other aims and objects of the invention may be recited, the provision of a lock of the character mentioned with a view to compactness, and in which the number of parts are few, the construction simple, the cost of production small, and efficiency and operation high.

The improvements in the details and arrangement of parts will be apparent from an inspection of the accompanying drawings in connection with the specific description hereinafter contained, and wherein the preferred embodiment of the invention is disclosed for the purpose of imparting a full understanding of the same.

In the drawings:—

Figure 2:
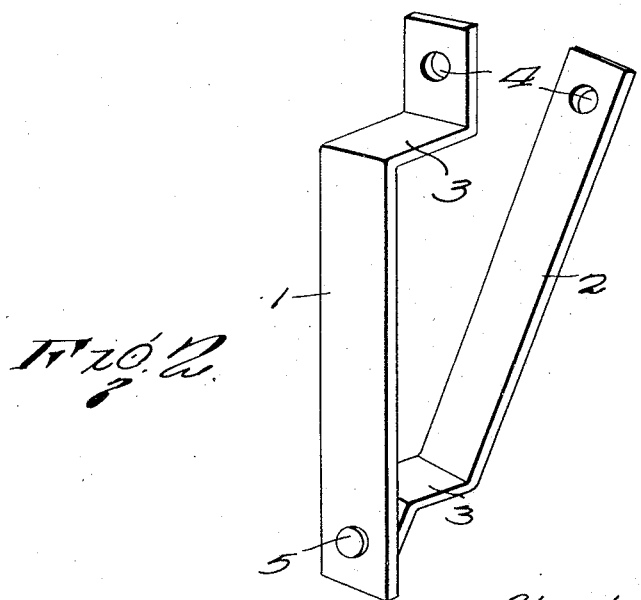

Figure 1 is a sectional view through a steering wheel having my improved lock applied thereto; and Fig. 2 is a perspective of the improved lock.

Similar characters of reference refer to similar parts throughout the several views of the drawings.

Having more particular reference to the drawings, W represents the steering wheel of the motor driven vehicle provided with the usual quadrant $q$ over which the control means of the vehicle are movable.

An improved lock comprising a plurality of pieces of metal 1 and 2 having the ends of the same offset as at 3. Openings 4 are arranged in the opposite ends of the metal pieces 1 and 2 and receive through certain openings thereof a pivot pin or rivet 5, it being noted in this connection, that one of the offset ends of the metal pieces is arranged adjacent the end of the body portion of the other metal piece.

When using the improved lock, the metal pieces 1 and 2 are engaged about the quadrant $q$ as shown in the Fig. 1 and one of the spokes of the wheel W, whereupon the free ends of the same are swung into alinement and receive the lock 6 or other suitable fastening means therethrough. With the improved lock thus applied to the steering wheel, it is obvious that theft of the same will be prevented, since the vehicle cannot be steered.

Manifestly, the construction shown is capable of considerable modification and such modification as is within the scope of my claims, I consider within the spirit of my invention.

I claim:

A device for locking the steering wheel of a vehicle comprising duplicate sections formed of flat strips each having one end portion bent to provide an inwardly extending arm holding the portions of the strips between the arms in spaced relation, the free end portions of the arms being bent outwardly to provide ears extending longitudinally of the sections and the contacting end portions of the strips being provided with registering openings, and a fastener passing through one set of openings to pivotally connect the sections for swinging movement with one section moving in a plane parallel to but out of the plane of the second section, the openings in the opposite ends of the sections being adapted to receive a releasable fastener.

In testimony whereof I affix my signature hereto.

CHARLES BRACKBILL.